US012293886B2

(12) United States Patent
Takano et al.

(10) Patent No.: US 12,293,886 B2
(45) Date of Patent: May 6, 2025

(54) SWITCH DEVICE

(71) Applicant: TOYO DENSO KABUSHIKI KAISHA, Tokyo (JP)

(72) Inventors: Takuya Takano, Tsurugashima (JP); Xiageng Lin, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 18/107,087

(22) Filed: Feb. 8, 2023

(65) Prior Publication Data

US 2023/0260724 A1 Aug. 17, 2023

(30) Foreign Application Priority Data

Feb. 17, 2022 (JP) ................................ 2022-023262

(51) Int. Cl.
*H01H 25/06* (2006.01)
*H01H 13/14* (2006.01)
*H01H 19/14* (2006.01)

(52) U.S. Cl.
CPC .......... *H01H 25/065* (2013.01); *H01H 13/14* (2013.01); *H01H 19/14* (2013.01); *H01H 2231/026* (2013.01); *H01H 2300/01* (2013.01)

(58) Field of Classification Search
CPC .......... H01H 3/02; H01H 23/00; H01H 23/02; H01H 23/08; H01H 2003/028; H01H 2221/016; H01H 21/22; H01H 21/24; H01H 13/14; H01H 13/50; H01H 19/14; H01H 2231/016; H01H 2231/026; H01H 2300/01; H01H 25/06
See application file for complete search history.

(56) References Cited

U.S. PATENT DOCUMENTS 5,560,475 A * 10/1996 Brundage ............ H01H 23/025
200/313
2006/0163052 A1 7/2006 Ito
2020/0105482 A1 4/2020 Kosugi et al.

FOREIGN PATENT DOCUMENTS

JP 4461033 B2 5/2010
JP 6714365 B2 6/2020

* cited by examiner

*Primary Examiner* — Anthony R Jimenez
(74) *Attorney, Agent, or Firm* — Keating & Bennett, LLP

(57) ABSTRACT

A switch device includes a case serving as a base portion and a knob attached to a fitting portion provided in the vicinity of an upper end of a cylindrical portion, in which the knob rotates in a seesaw-like manner around a rotary shaft member provided in the fitting portion, the knob includes an operation portion capable of being pulled up, the operation portion being provided on the front end side defined using the rotary shaft member as a boundary, and an abutment portion provided on the rear end side defined using the rotary shaft member as the boundary, the case includes a stopper portion configured to contact the abutment portion when the operation portion is pulled up, and the knob includes an extending portion extending toward the rear end side, the abutment portion being provided in the extending portion.

5 Claims, 8 Drawing Sheets

10

SWITCH DEVICE

BACKGROUND OF THE INVENTION

Field of the Invention

The present invention relates to a switch device, and more particularly to a switch device configured to operate a power window driving motor of an automobile or the like.

Description of the Related Art

As shown in FIG. 8A, a switch device configured to operate a power window driving motor of an automobile or the like includes a case 80 having a housing shape, and a knob 81 attached to an opening portion at a distal end of a cylindrical portion 80*b* protruding from an upper surface 80*a* of the case 80. The knob 81 is engaged with a rotary shaft member 80*c* provided in the cylindrical portion 80*b*, and rotates in a seesaw-like manner with respect to the case 80 around the rotary shaft member 80*c* (refer to white arrow in drawing).

In the switch device of FIGS. 8A to 8C, when a front end 81*a* of the knob 81 is pulled up through the user's operation, the knob 81 first rotates around the rotary shaft member 80*c* (refer to FIG. 8B), but when the rotation amount increases, a rear end 81*b* of the knob 81 abuts on a stopper portion 80*d* provided on the case 80 (refer to FIG. 8C), and thereafter, the knob 81 rotates with respect to the case 80 with the stopper portion 80*d* serving as a fulcrum. At this time, force for pulling up the front end 81*a* of the knob 81 acts on an engagement portion 81*c* of the knob 81 with the rotary shaft member 80*c* as engagement releasing force 82 for releasing the engagement between the knob 81 and the rotary shaft member 80*c* according to the principle of leverage, and as such, the knob 81 may be detached from the cylindrical portion 80*b* of the case 80.

Meanwhile, since the knob 81 is deformed when the knob 81 is detached from the cylindrical portion 80*b* of the case 80, a technique has been proposed in which a restriction wall (not illustrated) is erected on the side of the knob 81 to suppress deformation of the knob 81, and as a result, detachment of the knob 81 from the case 80 is suppressed (for example, refer to Japanese Patent No. 4461033).

However, when the restriction wall is erected on the side of the knob 81, a degree of freedom of the layout of each component of the switch device is reduced, which may cause a problem that miniaturization of the switch device is hindered. In addition, since the restriction wall may be an obstacle when the knob 81 is attached to the case 80, assembly performance of the switch device may deteriorate.

SUMMARY OF THE INVENTION

The present invention provides a switch device configured to increase a degree of freedom of layout of each component and to suppress deterioration in assembly performance.

Accordingly, an aspect of the present invention provides a switch device including: a case serving as a base portion, a cylindrical portion protruding from the case, and a knob serving as an operation member attached to a fitting portion provided in the cylindrical portion, in which the knob rotates in a seesaw-like manner around a rotary shaft member provided in the cylindrical portion, the knob includes an operation portion at least capable of being pulled up, the operation portion being provided on one side of the knob, the one side being defined using the rotary shaft member as a boundary, and an abutment portion located on another side of the knob, the other side being defined using the rotary shaft member as the boundary, the case includes a stopper portion configured to contact the abutment portion when the operation portion is pulled up, and the knob has an extending portion formed to extend toward the other side, in which the abutment portion is provided in the extending portion.

According to the present invention, since an abutment portion of a knob is provided in an extending portion of the knob, when the abutment portion of the knob abuts on a stopper portion of a case and the knob rotates with respect to the case with the stopper portion serving as a fulcrum, a distance from the rotary shaft member to the stopper portion can be made relatively large with respect to a distance from an operation portion of the knob to the stopper portion. As a result, it is possible to reduce engagement releasing force acting on an engagement portion of the knob with the rotary shaft member by the principle of leverage due to force for pulling up the operation portion of the knob, thereby making it possible to suppress detachment of the knob from the case. As a result, it is possible to eliminate the necessity of providing a restriction wall on the side of the knob, and thus, it is possible not only to increase the degree of freedom of the layout of each component of the switch device but also to avoid deterioration in assembly performance of the switch device.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

Figure 1:
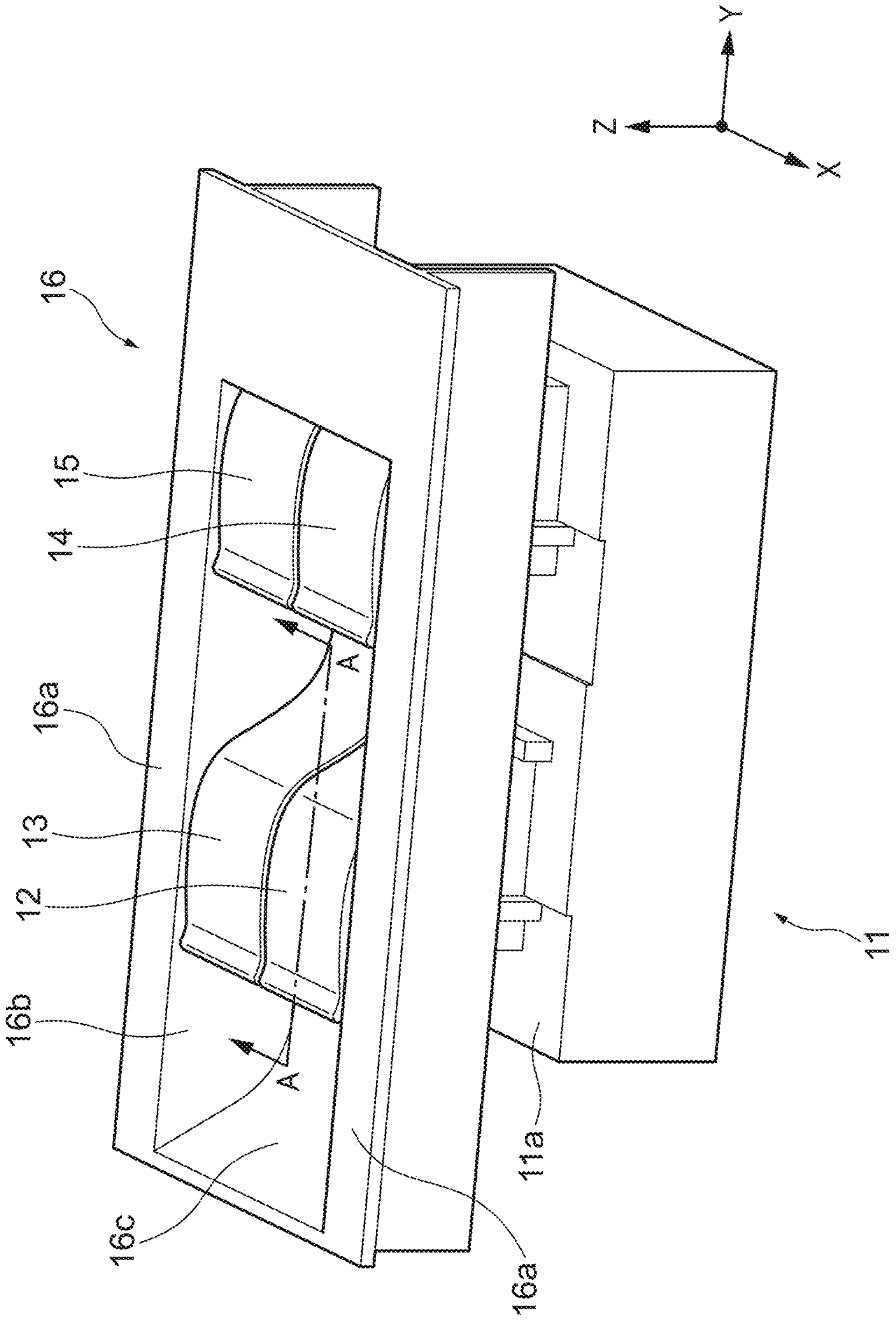
FIG. 1 is a perspective view schematically showing a configuration of a switch device according to an embodiment of the present invention.

FIG. 1 is a perspective view schematically showing a configuration of a switch device 10 according to an embodiment of the present invention. In FIG. 1, the switch device 10 includes a case 11 having a housing shape and serving as a base portion, four knobs 12 to 15 serving as operation members arranged in two rows vertically and two rows horizontally on an upper surface 11*a* of the case 11, and a frame-shaped panel 16 arranged above the case 11 so as to surround the four knobs 12 to 15. The switch device 10 is attached to, for example, a door trim of a vehicle. An X direction in this figure indicates a left-and-right direction in the vehicle, a Y direction in this figure indicates a forward-and-rearward direction in the vehicle, and a Z direction in this figure indicates a vertical direction in the vehicle.

In the switch device 10, the knob 12 is disposed on the left front side, the knob 13 is disposed on the right front side, the knob 14 is disposed on the left rear side, and the knob 15 is disposed on the right rear side. In addition, the knob 12 corresponds to a power window driving motor of a left front door of the vehicle, the knob 13 corresponds to a power window driving motor of a right front door of the vehicle, the knob 14 corresponds to a power window driving motor of a left rear door of the vehicle, and the knob 15 corresponds to a power window driving motor of a right rear door of the vehicle. By operating one of the knobs 12 to 15 in a seesaw-like manner, a user can drive a corresponding power window driving motor to move a desired window upwards and downwards.

In addition, the panel 16 includes a flange portion 16*a* formed to horizontally extend on the upper portion thereof, an opening portion 16*b* configured to accommodate the four knobs 12 to 15, and a wall-shaped shielding portion 16*c* disposed at a portion where the four knobs 12 to 15 do not exist in the opening portion 16*b*. The flange portion 16*a* and the shielding portion 16*c* prevent the case 11 from being viewed by the user when the switch device 10 is attached to, for example, the door trim of the vehicle.

Figure 2A:
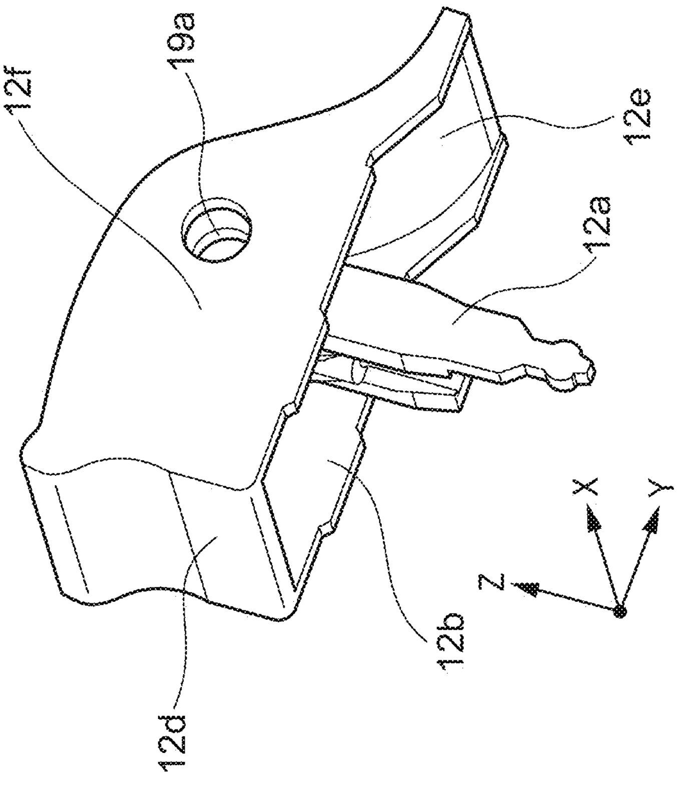
FIGS. 2A and 2B are perspective views showing an appearance of a knob of the switch device in FIG. 1.
Figure 2B:
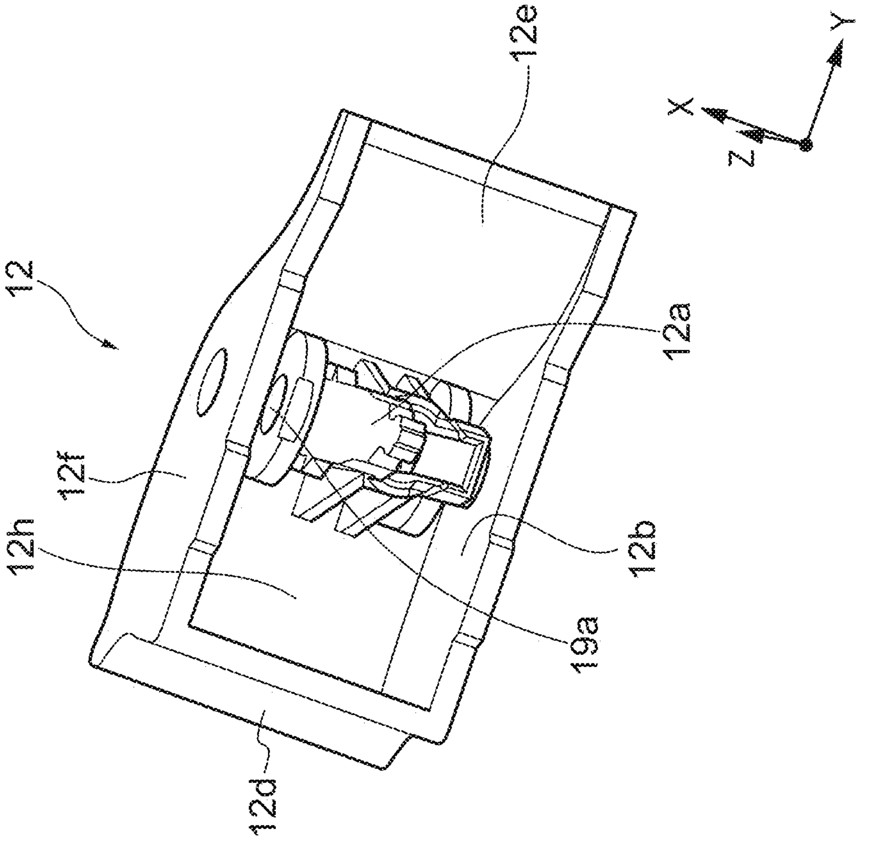
Figure 3:
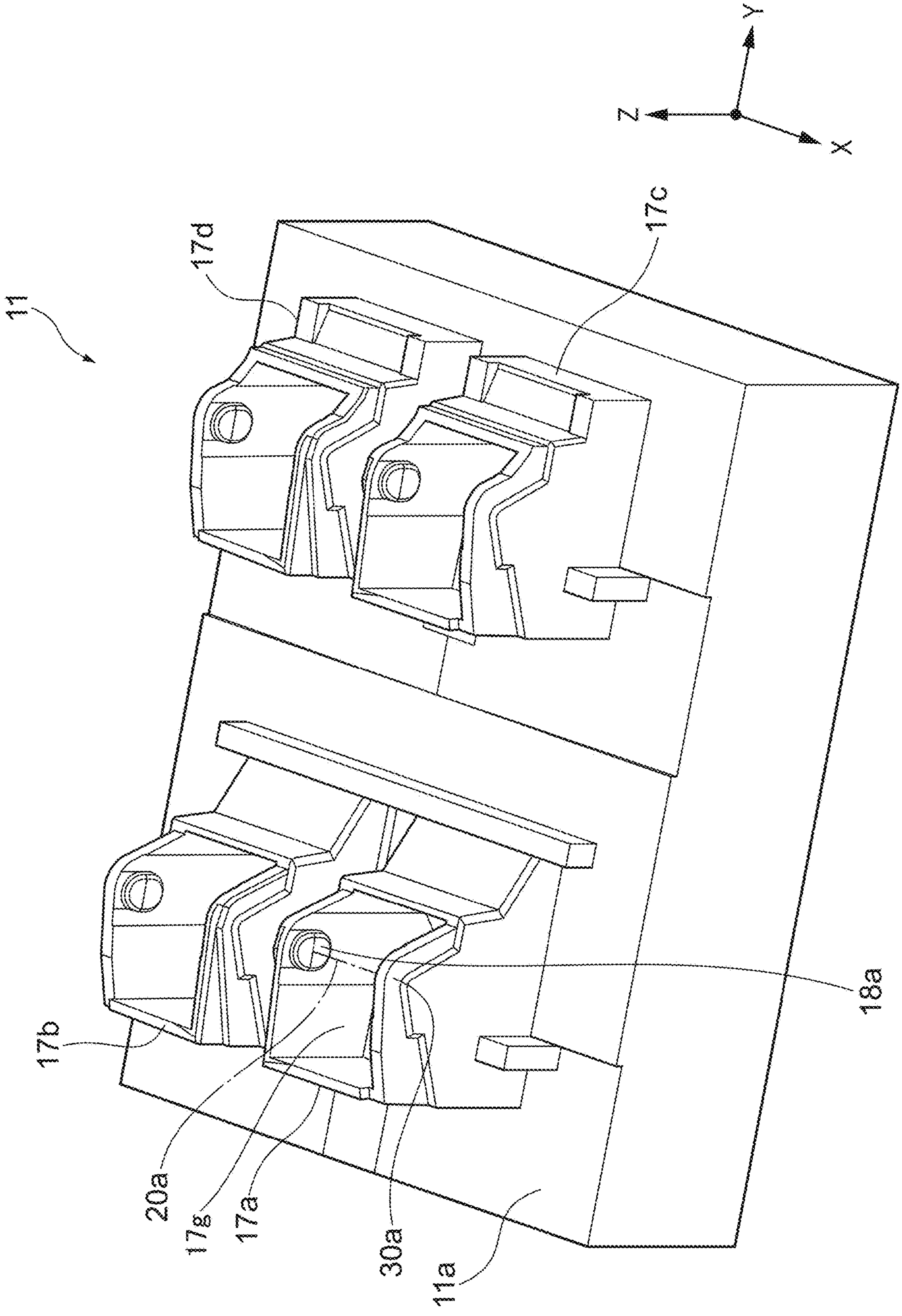
FIG. 3 is a perspective view showing an appearance of a case of the switch device in FIG. 1.

FIGS. 2A and 2B are perspective views showing an appearance of the knob 12 of the switch device 10, and FIG. 3 is a perspective view showing an appearance of the case 11 of the switch device 10. It should be noted that FIG. 2A shows a case where the knob 12 is viewed obliquely from below on the left side, FIG. 2B shows a case where the knob 12 is viewed from below, and FIG. 3 shows a case where the case 11 is viewed obliquely from above on the left side.

The case 11 has four cylindrical portions 17*a* to 17*d* protruding upwards from the upper surface 11*a*. The knob 12 has a protrusion 12*a* protruding downwards. By inserting the protrusion 12*a* of the knob 12 into the cylindrical portion 17*a*, the knob 12 is attached to a fitting portion 30*a* provided in the vicinity of the distal end of the cylindrical portion 17*a*. In addition, the cylindrical portion 17*a* has a rotary shaft member 18*a* which is a cylindrical convex portion protruding in the left-and-right inner direction in the fitting portion 30*a*. The knob 12 includes, when attached to the fitting portion 30*a*, a front wall 12*d* configured to cover the front side of the cylindrical portion 17*a*, a rear wall 12*e* configured to cover the rear side of the cylindrical portion 17*a*, a right side wall 12*b* configured to cover the right side of the cylindrical portion 17*a*, and a left side wall 12*f* configured to cover the left side of the cylindrical portion 17*a*. It should be noted that the right side wall 12*b* and the left side wall 12*f* connect the front wall 12*d* (one side) and the rear wall 12*e* (the other side), respectively. In addition, the knob 12 has a top surface 12*h* connected to the upper end portions of the front wall 12*d*, the rear wall 12*e*, the right side wall 12*b*, and the left side wall 12*f*, the top surface 12*h* facing an opening portion 17*g* that opens at the upper portion of the cylindrical portion 17*a*. The knob 12 has a round hole-shaped engagement portion 19*a* that opens in the left-and-right direction in the protrusion 12*a*. When the protrusion 12*a* of the knob 12 is attached to the fitting portion 30*a* of the cylindrical portion 17*a*, the rotary shaft member 18*a* is engaged with the engagement portion 19*a*. When the knob 12 is attached to the cylindrical portion 17*a*, a wall portion of the cylindrical portion 17*a* is inserted between the right side wall 12*b* and the left side wall 12*f*, and the protrusion 12*a*. As a result, the rigidity of the knob 12 and the cylindrical portion 17*a* in the left-and-right direction is improved, and when operation force acting on the knob 12 acts on the right side wall 12*b*, the left side wall 12*f*, the protrusion 12*a*, and the wall portion of the cylindrical portion 17*a*, the same are hardly deformed outwards in the left-and-right direction, and as a result, it is possible to prevent detachment of the knob 12. It should be noted that the rotary shaft member 18*a* of the cylindrical portion 17*a* may protrude outwards in the left-and-right direction.

Furthermore, each of the knobs 13 to 15 also has a protrusion similar to the protrusion 12*a*, and each of the knobs 13 to 15 is attached to a corresponding one of the fitting portions of the cylindrical portions 17*b* to 17*d* by inserting the protrusion into the corresponding cylindrical portion. Each of the cylindrical portions 17*b* to 17*d* has a rotary shaft member similar to the rotary shaft member 18*a*, each of the knobs 13 to 15 also has an engagement portion similar to the engagement portion 19*a* in the protrusion, and when the protrusion of each of the knobs 13 to 15 is attached to the fitting portion of the corresponding cylindrical portion, the rotary shaft member of the corresponding cylindrical portion is engaged with the engagement portion.

Figure 4:
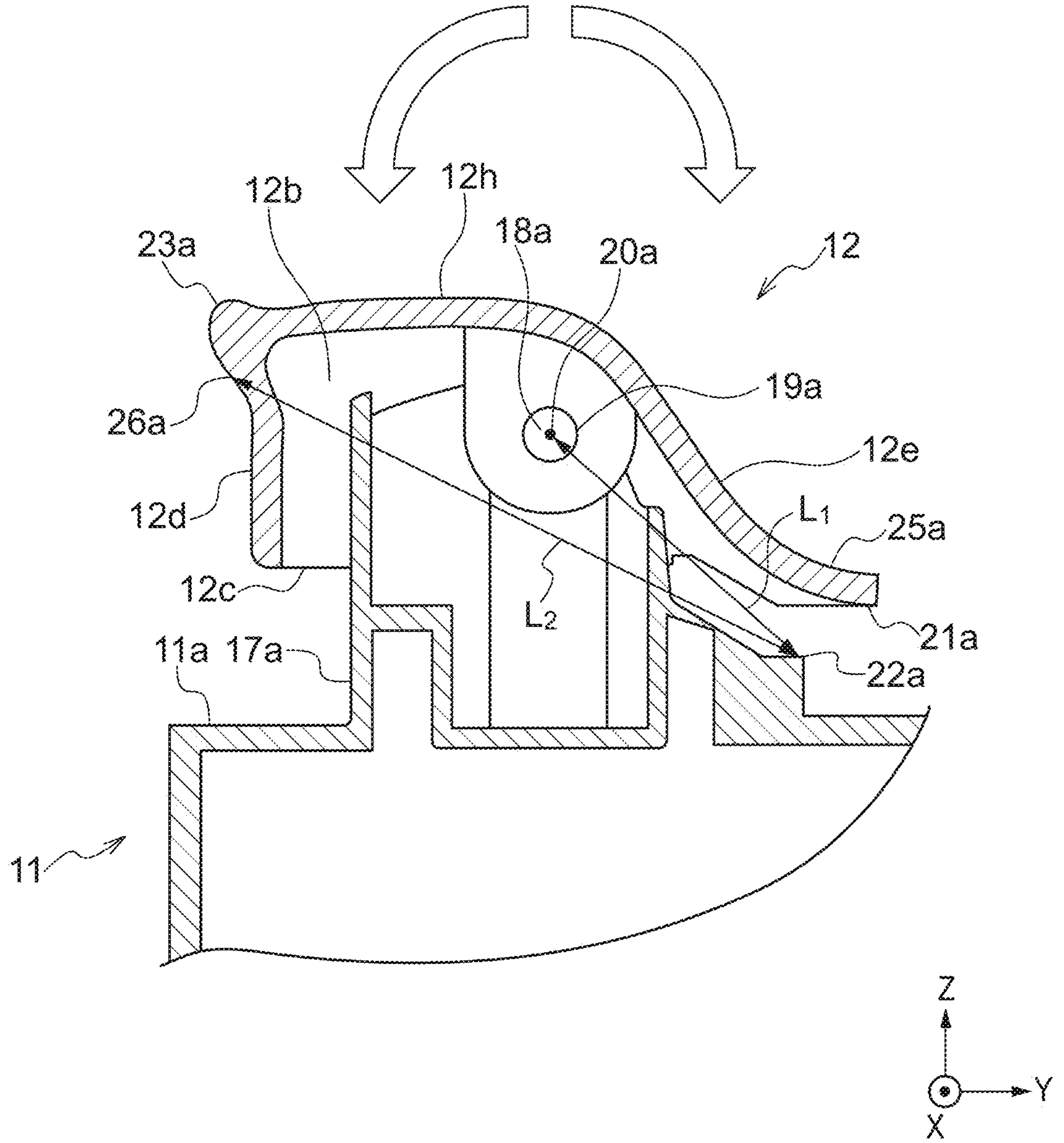
FIG. 4 is a cross-sectional view taken along line A-A in FIG. 1.

FIG. 4 is a cross-sectional view taken along line A-A in FIG. 1, and shows a cross section of the knob 12 and the cylindrical portion 17*a* of the case 11. As described above, since the rotary shaft member 18*a* of the fitting portion 30*a* of the cylindrical portion 17*a* of the case 11 is engaged with the engagement portion 19*a* of the protrusion 12*a* of the knob 12, the knob 12 rotates around a rotary shaft 20*a* passing through the center of the rotary shaft member 18*a* (engagement portion 19*a*) in the left-and-right direction (X direction in drawing). That is, the knob 12 rotates around the rotary shaft 20*a* in a seesaw-like manner with respect to the case 11 (refer to white arrow in drawing).

The knob 12 includes an operation portion 23*a* provided on the front end side (one side) defined using the rotary shaft member 18*a* as a boundary in the forward-and-rearward direction, and an abutment portion 21*a* provided on the rear end side (the other side) defined using the rotary shaft member 18*a* as the boundary in the forward-and-rearward direction. When the user operates the knob 12, the user pulls up the operation portion 23*a* of the knob 12 in the forward-and-rearward direction toward the top surface 12*h* of the knob 12, or pushes the operation portion 23*a* toward the case 11. In addition, the switch device 10 is provided with a stopper mechanism configured to prevent rotation of the knob 12 so as not to excessively rotate the knob 12 when the user pulls up the operation portion 23*a* of the knob 12. Specifically, in the knob 12, the abutment portion 21*a* is provided on the opposite side of the operation portion 23*a* with respect to the rotary shaft 20*a*, and a stopper portion 22*a* is provided in the case 11 so as to face the abutment portion 21*a*.

Figure 5A:
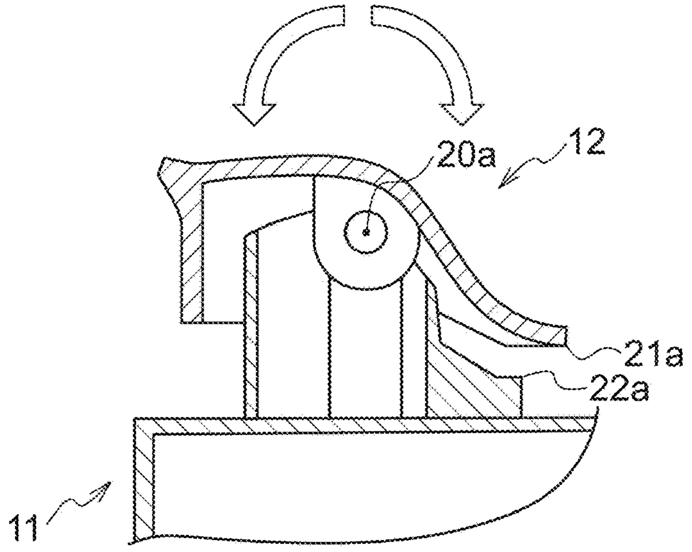
FIGS. 5A to 5C are process diagrams indicating a rotation operation of the knob when a front end of the knob of the switch device in FIG. 1 is pulled up.
Figure 5B:
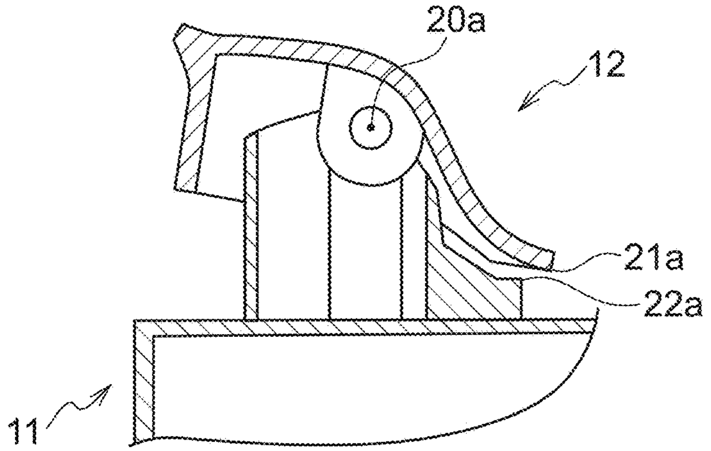
Figure 5C:
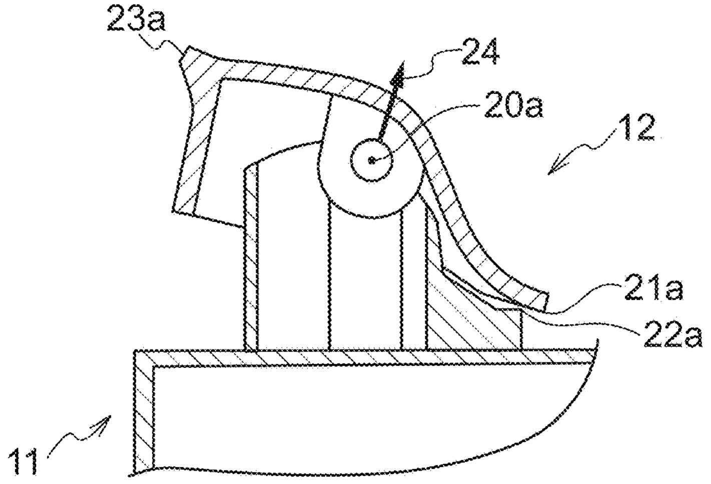

FIGS. 5A to 5C are process diagrams indicating the rotation operation of the knob 12 when the operation portion 23*a* of the knob 12 is pulled up.

First, in a state where the knob 12 does not rotate with respect to the case 11, there is a gap between the abutment portion 21*a* and the stopper portion 22*a*, and the abutment portion 21*a* and the stopper portion 22*a* do not contact each other (FIG. 5A).

Thereafter, when the user starts to pull up the operation portion 23*a* of the knob 12 (rotates knob 12 clockwise in this figure), the abutment portion 21*a* approaches the stopper portion 22*a* (FIG. 5B), and as such, the abutment portion 21*a* abuts on the stopper portion 22*a* (FIG. 5C). Accordingly, clockwise rotation of the knob 12 is suppressed. That is, the abutment portion 21*a* and the stopper portion 22*a* function as the stopper mechanism when the user pulls up the operation portion 23*a* of the knob 12.

Here, even after the abutment portion 21*a* abuts on the stopper portion 22*a*, when the user tries to keep pulling up the operation portion 23*a* of the knob 12, the stopper portion 22*a* serves as a fulcrum, and the knob 12 tends to rotate clockwise with respect to the case 11 around the stopper portion 22*a* instead of the rotary shaft 20*a*. At this time, force for pulling up the operation portion 23*a* acts on the engagement portion 19*a* of the knob 12 as engagement releasing force 24 for releasing the engagement between the engagement portion 19*a* of the knob 12 and the rotary shaft member 18*a* of the case 11 according to the principle of leverage. Accordingly, the knob 12 may be detached from the case 11 by the engagement releasing force 24.

Meanwhile, in the present embodiment, the stopper mechanism is constructed to reduce the engagement releasing force 24. Specifically, as the stopper mechanism, an extending portion 25*a* is provided and the abutment portion 21*a* is provided in the extending portion 25*a*. Here, the extending portion 25*a* is formed by extending the rear wall 12*e* of the knob 12 toward the rear end side (the other side) and further extending the same downwards than the end portion on the case 11 side on each of the front end sides of the right side wall 12*b* and the left side wall 12*f* of the knob 12. That is, the extending portion 25*a* further extends downwards than a bottom portion 12*c*. It can also be said that the extending portion 25*a* further protrudes toward the case 11 side than the bottom portion 12*c*.

As a result, in the state where the knob 12 does not rotate with respect to the case 11, a distance $L_1$ (first distance) from the rotary shaft member 18*a* (rotary shaft 20*a*) to the stopper portion 22*a* can be made relatively large with respect to a distance $L_2$ (second distance) from an operation point 26*a* to the stopper portion 22*a*, in which the operation point 26*a* is located in the vicinity of the operation portion 23*a* where the user's finger is engaged and operation force of the user acts when the operation portion 23*a* of the knob 12 is pulled up. Specifically, the distance $L_1$ is 60% or more of the distance $L_2$.

Here, since the engagement releasing force 24 acting on the engagement portion 19*a* according to the principle of leverage and caused by the operation force acting on the operation point 26*a* is expressed by the following formula (1), the engagement releasing force 24 can be reduced by making the distance $L_1$ relatively large with respect to the distance $L_2$.

$$\text{Engagement releasing force } \mathbf{24} = \text{operation force} \times (\text{distance } L_2/\text{distance } L_1) \quad (1)$$

As a result, since detachment of the knob 12 from the case 11 can be suppressed, it is possible to eliminate the necessity of providing the restriction wall on the side of the knob 12. Accordingly, it is possible not only to increase the degree of freedom of the layout of each component of the switch device 10 but also to suppress deterioration in assembly performance of the switch device 10.

It should be noted that, although the knob 12 is coated, in the present embodiment, coating is not applied to a portion of the abutment portion 21*a* of the extending portion 25*a* of the knob 12, the portion abutting on the stopper portion 22*a*. That is, there is no coating that is worn away due to repeated abutment between the abutment portion 21*a* and the stopper portion 22*a* at the time of rotation of the knob 12. Therefore, it is possible to suppress a change in the rotation amount of the knob 12. As a result, a change in the relationship between the distance $L_1$ and the distance $L_2$ caused by the change in the rotation amount of the knob 12 is suppressed, and as such, the difficulty of detaching the knob 12 from the case 11 can be maintained in the originally intended state. In addition, since coating is not applied to the portion of the abutment portion 21*a* that abuts on the stopper portion 22*a*, the distance $L_1$ does not change from the initially intended value due to variations in the thickness of coating at the portion of the abutment portion 21*a* abutting on the stopper portion 22*a*. Therefore, even after the knob 12 is assembled to the case 11 after coating is applied to the knob 12, the intended rotation amount of the knob 12 can be realized. Further, since the portion of the abutment portion 21*a* where coating is not applied can be obtained by hiding the aforementioned portion by fitting the protruding abutment portion 21*a* into a slit or the like of a jig for fixing the knob 12 when coating is applied to the knob 12, it is possible to eliminate the necessity of taking a protection measure against coating adhesion to the abutment portion 21*a*, such as masking, when coating is applied to the knob 12.

In the present embodiment, the extending portion 25*a* extends to the rear end side of the knob 12 and extends below the bottom portion 12*c* of the knob 12. However, as long as distance $L_1$ can be made relatively large with respect to distance $L_2$, the extending portion 25*a* may extend only to the rear end side of the knob 12, or may extend only below the bottom portion 12*c* of the knob 12. Further, the operation portion 23*a* of the knob 12 may coincide with the operation point 26*a*.

Figure 6A:
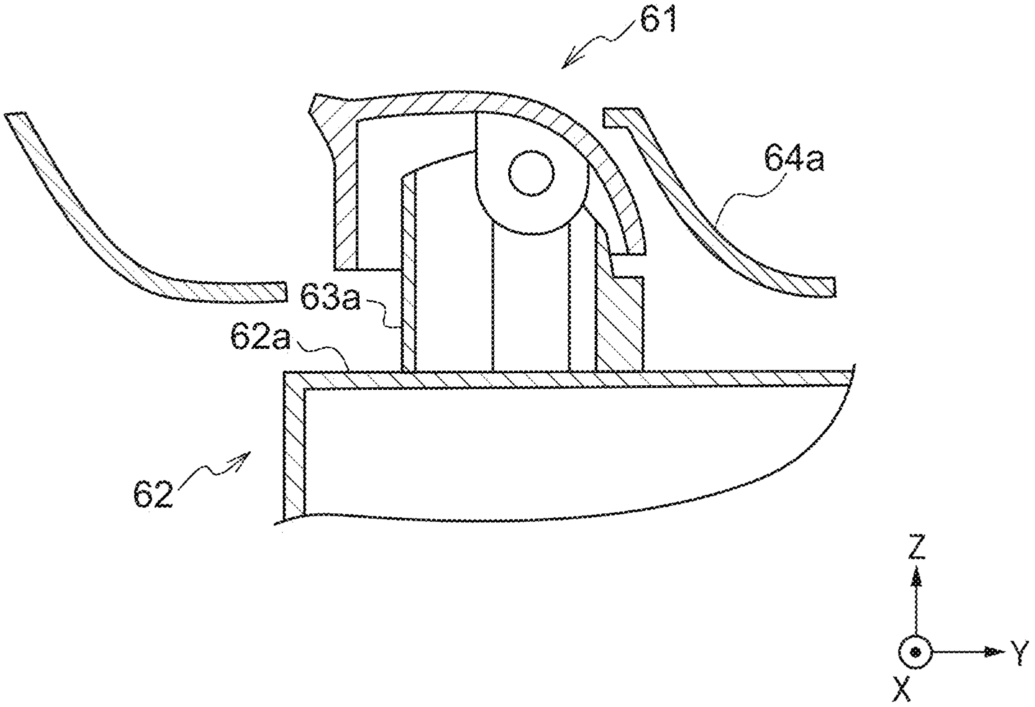
FIGS. 6A and 6B are cross-sectional views indicating a difference in shape between a knob of a conventional switch device and the knob of the switch device according to an embodiment of the present invention.

As shown in FIG. 6A, in a conventional switch device, a knob 61 does not include an extending portion extending toward the rear end side and extending downwards. Therefore, in order to prevent the user from visually recognizing an upper surface 62*a* and a cylindrical portion 63*a* of a case 62, it is necessary to provide a shielding portion 64*a* configured to cover the upper surface 62*a* and the cylindrical portion 63*a* of the case 62 on the panel on the rear end side of the knob 61. Then, in order to avoid interference between the rotating knob 61 and the shielding portion 64*a*, it is necessary to secure a gap between the knob 61 and the shielding portion 64*a*. As a result, the length of the switch device in the forward-and-rearward direction (Y direction in this figure) cannot be reduced, and there is limitation in achieving miniaturization of the switch device.

Figure 6B:
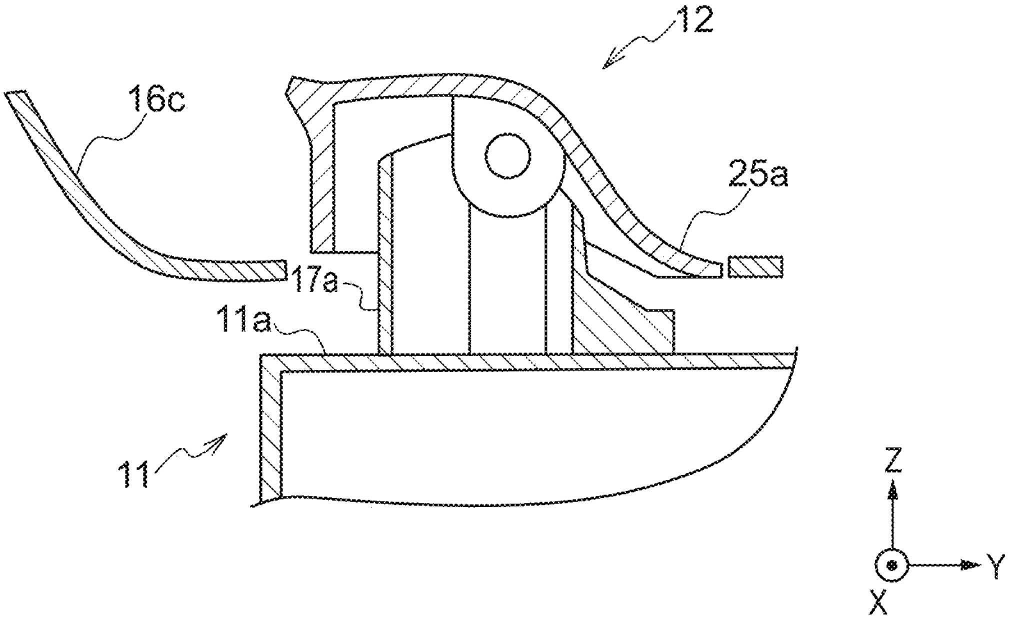

On the other hand, as shown in FIG. 6B, the extending portion 25*a* of the knob 12 according to the present embodiment covers the upper surface 11*a* and the cylindrical portion 17*a* of the case 11, and as such, the upper surface 11*a* and the cylindrical portion 17*a* of the case 11 can be prevented from being visually recognized by a user. Therefore, since it is not necessary to provide a shielding portion configured to cover the rear end side of the knob 12 on the panel 16, it is not necessary to secure a gap between the knob 12 and the shielding portion of the panel 16. As a result, the length of the switch device 10 in the forward- and rearward direction (Y direction in this figure) can be reduced, thereby making it possible to miniaturize the switch device 10. In addition, since the extending portion 25*a* has an R-shape so that a cross-sectional shape thereof draws an arc in a side view, designability of the knob 12 can be enhanced.

It should be noted that, in the switch device 10, the knob 13 has the same configuration as the knob 12. In addition, the knobs 14 and 15 have the same configuration as the knob in the conventional switch device as shown in FIG. 6A, but the knobs 14 and 15 may also have the same configuration as the knob 12.

Although the preferred embodiments of the present invention have been described above, the present invention is not limited to the above-described embodiments, and various variations and changes can be made within the scope of the gist of the present invention.

Figure 7A:
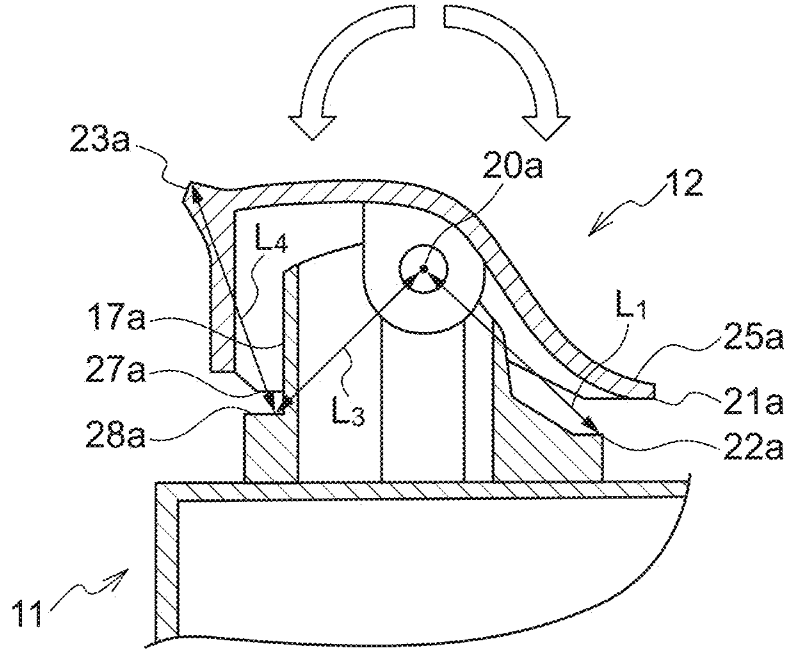
FIGS. 7A and 7B are cross-sectional views schematically showing a configuration of a variation of the switch device according to the embodiment of the present invention.

For example, in the knob 12, the abutment portion 21*a* is provided only on the opposite side of the operation portion 23*a* with respect to the rotary shaft 20*a*. However, as shown in FIG. 7A, in addition to the abutment portion 21*a*, another abutment portion 27*a* may be provided on the same side as the operation portion 23*a* with respect to the rotary shaft 20*a* (front end side defined based on rotary shaft member 18*a* serving as boundary in forward-and-rearward direction). Similarly to the extending portion 25*a*, the other abutment portion 27*a* further protrudes toward the case 11 than the bottom portion 12*c*. In addition, the case 11 is provided with another stopper portion 28*a* which faces the other abutment portion 27*a*.

In the state where the knob 12 does not rotate with respect to the case 11, there is a gap between the other abutment portion 27*a* and the other stopper portion 28*a*, and the other abutment portion 27*a* and the other stopper portion 28*a* do not contact each other (FIG. 7A).

Figure 7B:
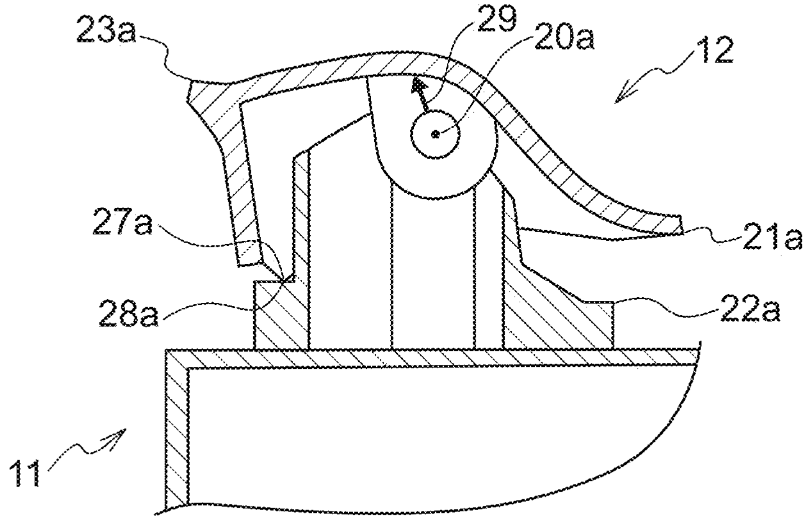
Figure 8A:
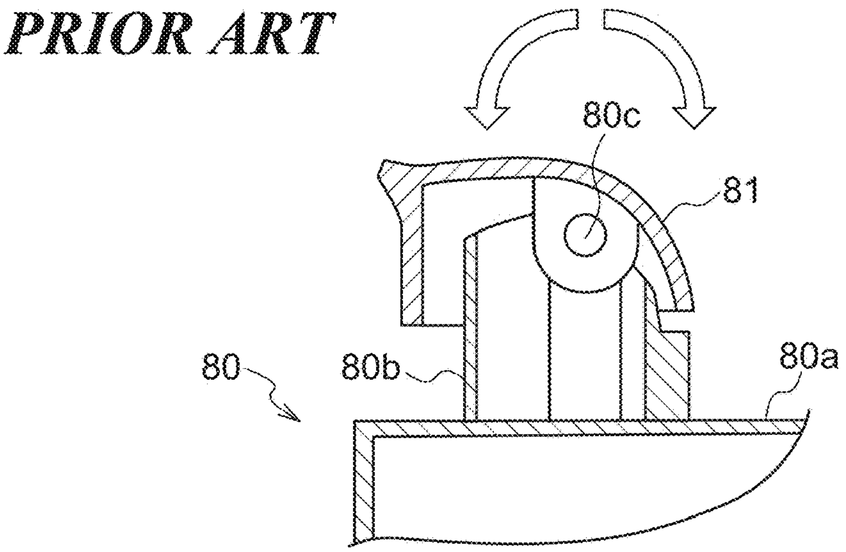
FIG. 8A PRIOR ART
FIGS. 8A to 8C are process diagrams indicating a rotation operation of a knob when a front end of the knob of the conventional switch device is pulled up.
Figure 8B:
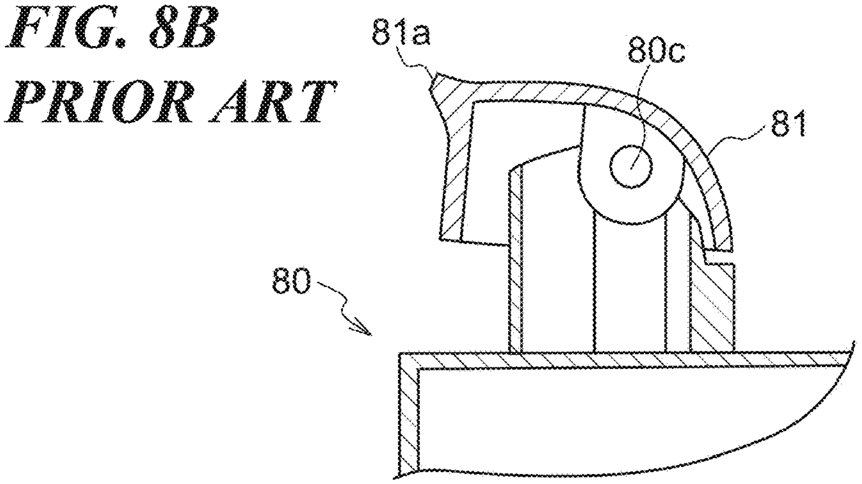
FIG. 8B PRIOR ART
Figure 8C:
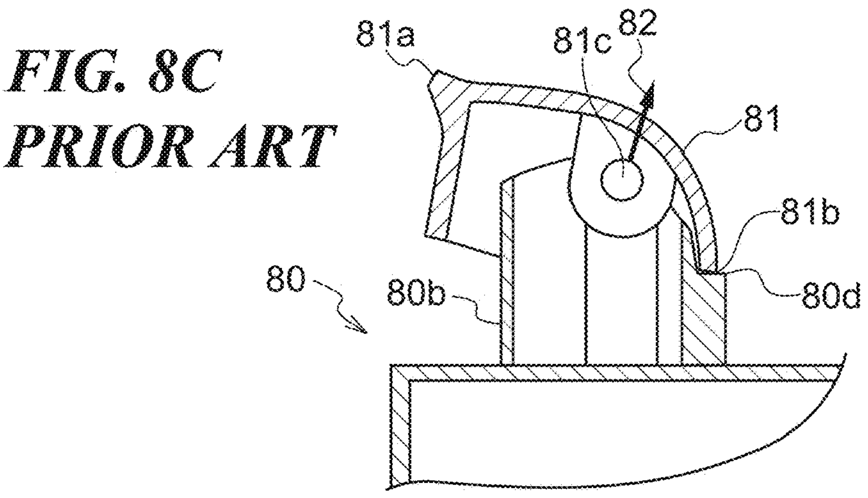
FIG. 8C PRIOR ART

Thereafter, when the user starts to push the operation portion 23*a* of the knob 12 downwards (rotates knob 12 counterclockwise in this figure), the other abutment portion 27*a* approaches the other stopper portion 28*a*, and as such, the other abutment portion 27*a* abuts on the other stopper portion 28*a* (FIG. 7B). As a result, counterclockwise rotation of the knob 12 is suppressed. That is, the other abutment portion 27*a* and the other stopper portion 28*a* function as the stopper mechanism when the user pushes the operation portion 23*a* of the knob 12 downwards.

Here, when the user tries to keep pushing the operation portion 23*a* of the knob 12 downwards even after the other abutment portion 27*a* abuts on the other stopper portion 28*a*, the other stopper portion 28*a* serves as a fulcrum, and the knob 12 tends to rotate counterclockwise with respect to the case 11 around the other stopper portion 28*a* instead of the rotary shaft 20*a*. At this time, force for pushing the operation portion 23*a* downwards acts on the engagement portion 19*a* of the knob 12 as another engagement releasing force 29 for releasing the engagement between the engagement portion 19*a* of the knob 12 and the rotary shaft member 18*a* of the case 11 according to the principle of leverage.

Here, the other engagement releasing force 29 acting on the engagement portion 19*a* according to the principle of leverage and caused by another operation force for pushing the operation portion 23*a* downwards is expressed by the following formula (2). It should be noted that a distance $L_3$ (third distance) is a distance from the rotary shaft member 18*a* (rotary shaft 20*a*) to the other stopper portion 28*a* in the state where the knob 12 does not rotate with respect to the case 11, and a distance $L_4$ is a distance from the operation portion 23*a* to the other stopper portion 28*a* in the state where the knob 12 does not rotate with respect to the case 11.

$$\text{Another engagement releasing force } \mathbf{29} = \text{another operation force} \times (\text{distance } L_4/\text{distance } L_3) \quad (2)$$

As shown in FIG. 7A, since the distance $L_4$ and the distance $L_3$ are not much different, the other engagement releasing force 29 becomes smaller than the engagement releasing force 24, and as such, there is no possibility that the knob 12 is detached from the case 11 by the other engagement releasing force 29. Therefore, in order to increase the distance $L_3$ and reduce the other engagement releasing force 29, it is not necessary to provide another extending portion similar to the extending portion 25*a* on the front end side of the knob 12. That is, there is no problem even if the distance $L_3$ remains short. As a result, the distance $L_3$ is equal to or less than the distance $L_1$. Conversely, the distance $L_1$ is equal to or greater than the distance $L_3$.

This application claims the benefit of Japanese Patent Application No. 2022-23262 filed on Feb. 17, 2022 which is hereby incorporated by reference herein in its entirety.

What is claimed is:

1. A switch device comprising:

a case serving as a base portion;

a cylindrical portion protruding from the case; and a knob serving as an operation member attached to a fitting portion provided in the cylindrical portion, wherein the knob rotates around a rotary shaft member provided in the cylindrical portion, the knob includes an operation portion at least capable of being pulled up, the operation portion being provided on one side of the knob, the one side being defined using the rotary shaft member as a boundary, and an abutment portion located on another side of the knob, the another side being defined using the rotary shaft member as the boundary, the case includes a stopper portion configured to contact the abutment portion when the operation portion is pulled up, the knob has a bottom portion on the one side of the knob and an extending portion extending to the another side and below the bottom portion in a state in which the knob is not rotated about the rotary shaft member, the abutment portion is provided in the extending portion, and the extending portion has an R-shape in a side view.

2. The switch device according to claim 1, wherein the knob has a side wall configured to connect the one side and the another side, and the extending portion further protrudes toward the case than an end portion on the case side of the side wall on the one side.

3. The switch device according to claim 2, wherein a first distance from the rotary shaft member to the stopper portion is 60% or more of a second distance from an operation point used when the knob is pulled up to the stopper portion in a state in which the knob does not rotate around the rotary shaft member.

4. The switch device according to claim 3, wherein the knob includes another abutment portion on the one side, the case includes another stopper portion on which the other abutment portion abuts when the operation portion is pushed down, and the first distance is equal to or larger than a third distance from the rotary shaft member to the other stopper portion in the state in which the knob does not rotate.

5. The switch device according to claim 4, wherein the other abutment portion further protrudes toward the case than the end portion of the side wall.

* * * * *